US012535762B2

(12) United States Patent
Arakawa et al.

(10) Patent No.: US 12,535,762 B2
(45) Date of Patent: Jan. 27, 2026

(54) SHEET CONVEYOR AND IMAGE FORMING APPARATUS

(71) Applicant: BROTHER KOGYO KABUSHIKI KAISHA, Nagoya (JP)

(72) Inventors: Takashi Arakawa, Nagoya (JP); Kotaro Haruta, Gifu (JP); Kazuya Taira, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/960,618

(22) Filed: Nov. 26, 2024

(65) Prior Publication Data

US 2025/0172899 A1 May 29, 2025

(30) Foreign Application Priority Data

Nov. 28, 2023 (JP) ................................ 2023-200779

(51) Int. Cl.
*G03G 15/00* (2006.01)
*G03G 21/16* (2006.01)

(52) U.S. Cl.
CPC ..... *G03G 15/6561* (2013.01); *G03G 15/6502* (2013.01); *G03G 15/6529* (2013.01); *G03G 15/6558* (2013.01); *G03G 21/1623* (2013.01); *G03G 21/1695* (2013.01); *G03G 2215/00679* (2013.01)

(58) Field of Classification Search
CPC ........... G03G 15/6561; G03G 15/6558; G03G 15/6529; G03G 15/6502; G03G 21/1623; G03G 21/1695; G03G 2215/00679
See application file for complete search history.

(56) References Cited

U.S. PATENT DOCUMENTS

| | | | | |
|---|---|---|---|---|
| 5,120,609 A * | 6/1992 | Blaszak | ................. | B65H 5/021 428/447 |
| 2013/0343794 A1* | 12/2013 | Takifuji | ................. | B65G 15/60 198/837 |
| 2017/0369261 A1* | 12/2017 | Morita | ................... | B65H 9/166 |

FOREIGN PATENT DOCUMENTS

JP 2021-116142 A 8/2021

* cited by examiner

*Primary Examiner* — Joseph S Wong
(74) *Attorney, Agent, or Firm* — Merchant & Gould P.C.

(57) ABSTRACT

A first roller includes a rotation shaft extending in a first direction. A second roller faces the first roller in a second direction. A first bearing supports an end portion of the rotation shaft. The first bearing is formed of a conductive resin. A second bearing supports the first end portion. The second bearing is formed of a material having higher toughness than the first bearing. A spring urges the first bearing in a direction in which the first roller presses the second roller. The spring is formed of a conductive material. A frame supports the second bearing to be movable in the second direction. The second bearing receives a force of the rotation shaft that moves in the first direction. The frame restricts movement in the first direction of the second bearing that receives the force of the rotation shaft that moves in the first direction.

13 Claims, 10 Drawing Sheets

SHEET CONVEYOR AND IMAGE FORMING APPARATUS

REFERENCE TO RELATED APPLICATIONS

This application claims priority from Japanese Patent Application No. 2023-200779 filed on Nov. 28, 2023. The entire content of the priority application is incorporated herein by reference.

BACKGROUND ART

A sheet conveyor for conveying a sheet in a printer, a scanner, and so on, is known.

SUMMARY

A sheet conveyor of one example includes a registration roller pair constituted by two rollers.

Two bearings are mounted on a first support portion that supports an end portion on one side of a rotation shaft of each roller, and a stopper is attached to a stopper attachment portion of the first support portion. The stopper is formed of a conductive resin, and prevents the bearing located above from coming off. That is, the stopper is a bearing that indirectly supports the end portion on one side of the rotation shaft.

This sheet conveyor is configured to release static electricity accumulated in the registration roller pair to the ground via the stopper.

However, in the above-described sheet conveyor including the bearing formed of the conductive resin, the toughness of the bearing is likely to be low. Thus, when a user accidentally drops the sheet conveyor while carrying the same, an impact acts on the rotation shaft of the roller, and the rotation shaft moves rapidly, the bearing may be easily damaged.

In view of the foregoing, an example of an object of this disclosure is to provide a sheet conveyor and an image forming apparatus configured to reliably release static electricity accumulated in a first roller and to suppress damage to a first bearing when an impact acts on the first roller.

According to one aspect, this specification discloses a sheet conveyor. The sheet conveyor includes a first roller, a second roller, a first bearing, a second bearing, a spring, and a frame. The first roller includes a rotation shaft extending in a first direction. The second roller faces the first roller in a second direction perpendicular to the first direction. The first roller and the second roller are configured to convey a sheet in cooperation with each other. The first bearing is configured to support a first end portion of the rotation shaft on one side in the first direction. The first bearing is formed of a conductive resin. Thus, the first bearing releases static electricity from the first roller. The second bearing is configured to support the first end portion. The second bearing is formed of a material having higher toughness than the first bearing. Thus, the second bearing resists an impact and a force. The spring is configured to urge the first bearing in a direction in which the first roller presses the second roller. The spring is formed of a conductive material. Thus, the spring releases the static electricity from the first roller. The frame is configured to support the second bearing to be movable in the second direction. Thus, the first roller is movable relative to the second roller in the second direction. The second bearing is configured to receive a force of the rotation shaft that moves in the first direction. Thus, the force is received by the second bearing having high toughness. The frame is configured to restrict movement in the first direction of the second bearing that receives the force of the rotation shaft that moves in the first direction. Thus, the second bearing is kept at a position in the first direction when the second bearing receives the force.

In the sheet conveyor of the present disclosure, the first bearing urged by the spring in a direction in which the first roller presses the second roller performs a function of transmitting the urging force of the spring to the rotation shaft. Thus, the first bearing is easily brought into close contact with the rotation shaft, and hence static electricity accumulated in the first roller is reliably released from the rotation shaft to the ground via the first bearing and the spring having conductivity.

The second bearing supported by the frame so as to be movable in the second direction causes the direction in which the first bearing and the rotation shaft move to be the second direction, and also causes the direction of the urging force of the spring to be the second direction. When the second bearing receives a force that moves the rotation shaft in the first direction, the movement of the second bearing in the first direction is restricted by the frame, and accordingly, the movement of the rotation shaft in the first direction is also restricted.

By such a role sharing between the first bearing and the second bearing, in the sheet conveyor, the function to be performed by the first bearing is reduced, and the first bearing is simplified.

When a user accidentally drops the sheet conveyor while carrying the sheet conveyor and an impact acts on the rotation shaft of the first roller, the rotation shaft moves rapidly. In this case, the second bearing receives a force that the rotation shaft moves in the first direction, and the movement of the second bearing in the first direction is restricted by the frame. As a result, in the sheet conveyor, the impact transmitted from the rotation shaft is received by the second bearing and the frame formed of a material having higher toughness than the first bearing. Thus, the impact acting on the first bearing which is formed of a conductive resin and thus tends to have low toughness is suppressed.

Thus, the sheet conveyor of the present disclosure releases static electricity accumulated in the first roller with high reliability, and suppresses the damage of the first bearing when an impact acts on the first roller.

BRIEF DESCRIPTION OF DRAWINGS

FIG. 2 is a partial perspective view showing first and second rollers, first to third bearings, a frame, a chute metal plate, a drawer, and so on.

FIG. 3 is a partial perspective view showing the first and second rollers, the first to third bearings, a compression coil spring, the frame, a holding portion and a releasing portion of the drawer, and so on.

FIG. 4 is a partial perspective view showing the first roller, the first to third bearings, the frame, and so on.

FIG. 5 is a partial perspective view showing the first roller, the third bearing, the frame, the chute metal plate, and so on.

FIG. 9 is a partial cross-sectional view taken along line A-A of FIG. 1, showing the first roller, the first and second bearings, the compression coil spring, the frame, and so on.

FIG. 10 is a partial cross-sectional view taken along line A-A in FIG. 1, showing the first roller, the third bearing, the compression coil spring, the frame, and so on.

DESCRIPTION

Hereinafter, an embodiment of the present disclosure will be described with reference to the drawings.

Figure 1:
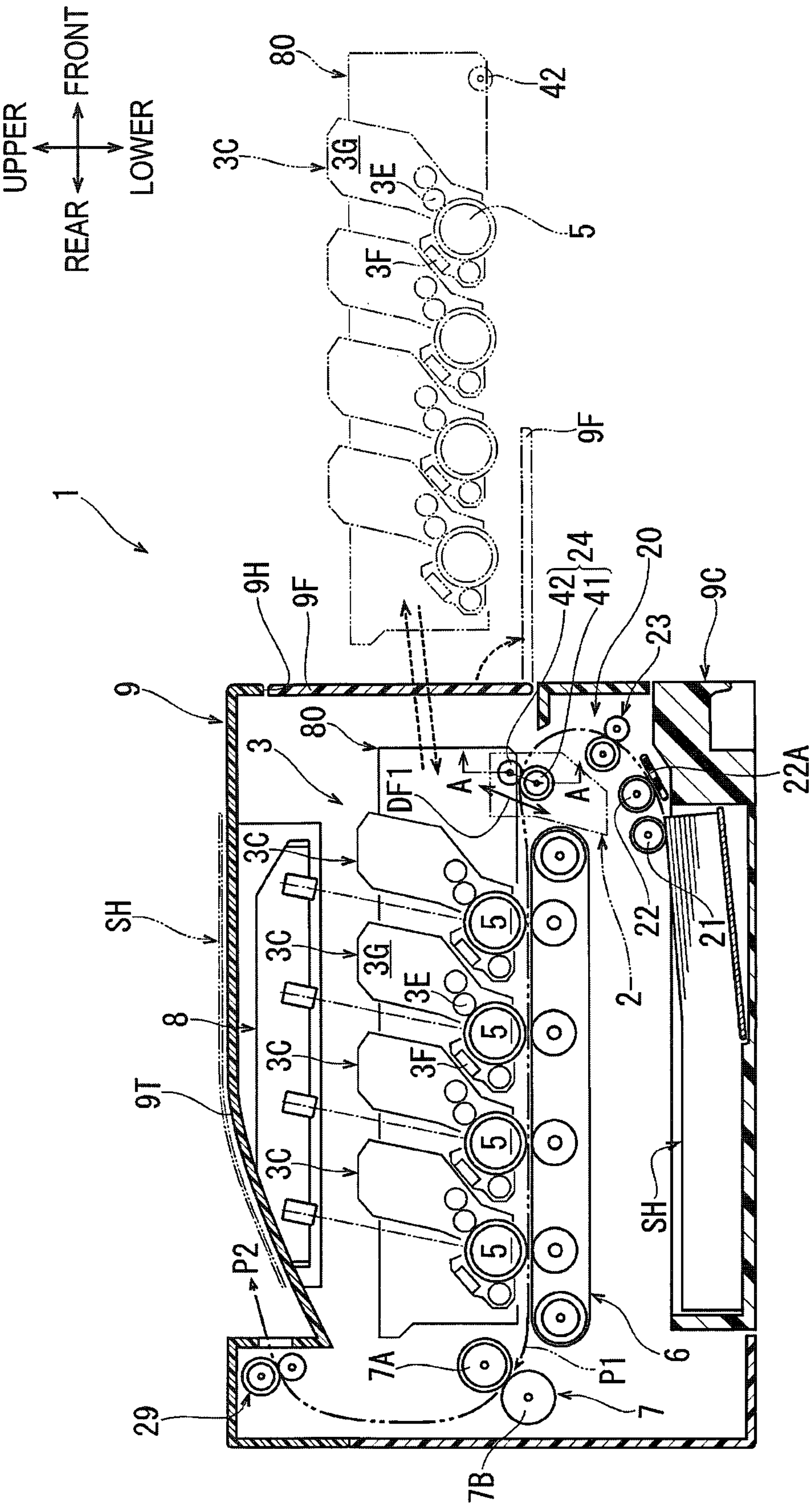
FIG. 1 is a schematic cross-sectional view of an image forming apparatus, showing a drawer in a mounted position and a pulled-out position.

As shown in FIG. 1, a sheet conveyor 2 of the embodiment is an example of a sheet conveyor of the present disclosure. An image forming apparatus 1 of the embodiment is an example of an image forming apparatus of the present disclosure, and includes the sheet conveyor 2. The image forming apparatus 1 is a color printer that forms an image on a sheet by an electrophotographic method.

The image forming apparatus 1 includes an apparatus main body 9 that is a substantially box-shaped body, and an image forming unit (print engine) 3, a sheet tray 9C, a feeder 20, and a discharge roller pair 29 that are housed in the apparatus main body 9. The sheet conveyor 2 constitutes a part of the feeder 20.

The sheet tray 9C is located below the image forming unit 3. The sheet tray 9C houses sheets SH in a stacked state before images are formed thereon. The sheets SH are paper, overhead projector sheets, and so on.

A discharge tray 9T is formed on the upper surface of the apparatus main body 9. The discharge tray 9T supports the sheets SH after images are formed thereon.

The apparatus main body 9 has an opening 9H and a front cover 9F. The opening 9H is open at the upper part of the front surface of the apparatus main body 9. The front cover 9F has a swing center axis at the lower end side, and closes the opening 9H in a standing state. As indicated by the two-dot chain line in FIG. 1, the front cover 9F swings such that its upper end moves forward and downward, and protrudes forward substantially horizontally, thereby opening the opening 9H.

A width direction of the image forming apparatus 1 is a direction perpendicular to a front-rear direction and an upper-lower direction. The side that is on the right side when facing the opening 9H and the front cover 9F of the apparatus main body 9, that is, the back side of the paper surface in FIG. 1, is one side in the width direction. The “one side” in the drawings means one side in the width direction, and “the other side” means the other side in the width direction. The front-rear direction, upper-lower direction, and width direction shown in each of FIG. 2 and subsequent drawings are displayed to be consistent with FIG. 1. The width direction of the image forming apparatus 1 is an example of “first direction”.

As shown in FIG. 1, the feeder 20 is located in front of the image forming unit 3. The feeder 20 includes a feed roller 21, a separation roller 22, a separation pad 22A, a conveyance roller pair 23, and the sheet conveyor 2 arranged along a conveyance path P1. The specific configuration of the sheet conveyor 2 will be described in detail later, and the sheet conveyor 2 includes a registration roller pair 24.

The conveyance path P1 is a path that extends forward and upward from the front end of the sheet tray 9C, then makes a U-turn, extends rearward substantially horizontally, and passes through the image forming unit 3.

The feed roller 21 feeds the sheets SH stored in the sheet tray 9C to the conveyance path P1. The separation roller 22 and the separation pad 22A separate the sheets SH fed by the feed roller 21 one sheet at a time when a plurality of sheets are stacked.

The conveyance roller pair 23 nips the sheet SH separated one sheet at a time by the separation roller 22 and the separation pad 22A and conveys the sheet SH toward the registration roller pair 24.

The registration roller pair 24 is located at the top of the U-turn portion of the conveyance path P1. The registration roller pair 24 has a first roller 41 and a second roller 42. The first roller 41 rotates while nipping the sheet SH between the first roller 41 and the second roller 42.

The first roller 41 and the second roller 42 contact the leading edge of the sheet SH conveyed toward the first roller 41 and the second roller 42 in a stopped state, and after a particular time has elapsed, start rotating to convey the sheet SH toward the image forming unit 3. This suppresses skew of the sheet SH.

The start of rotation of the first roller 41 and the second roller 42 is controlled based on the timing at which a sheet sensor (not shown) detects the leading edge of the sheet SH. The sheet sensor is located between the conveyance roller pair 23 and the registration roller pair 24 in the conveyance path P1.

In this way, the sheet SH conveyed toward the image forming unit 3 by the feeder 20 passes through the image forming unit 3 in a substantially horizontally extending portion of the conveyance path P1.

The image forming unit 3 is a direct-transfer-type color electrophotographic type. The image forming unit 3 includes a drawer 80, a transfer belt 6, a scanner unit 8, and a fixing unit 7.

The drawer 80 is a well-known structure and will not be illustrated in detail, but is a frame-shaped body made up of a pair of side walls extending in the front-rear direction located at the near and far sides in a direction perpendicular to the paper surface of FIG. 1, and a number of connecting members extending in the width direction and connecting the two side walls.

The apparatus main body 9 houses the drawer 80. The position of the drawer 80 indicated by the solid line in FIG. 1 is a mounted position where the drawer 80 is mounted on the apparatus main body 9, and is the position where the image forming unit 3 performs an image forming operation.

The drawer 80 supports four photosensitive drums 5 corresponding to four colors of toner, black, yellow, magenta, and cyan. The drawer 80 supports the photosensitive drums 5 rotatably about axes extending in the width direction. The photosensitive drums 5 are aligned in the front-rear direction along the substantially horizontally extending portion of the conveyance path P1.

The drawer 80 detachably holds four toner cartridges 3C. The toner cartridges 3C correspond to the photosensitive drums 5 in a one-to-one manner and are aligned in the front-rear direction along the substantially horizontally extending portion of the conveyance path P1. The toner cartridges 3C contain toner of the corresponding colors.

Each toner cartridge 3C includes a development roller 3E, a charger 3F, and a toner storage portion 3G, which are located around each photosensitive drum 5.

The apparatus main body 9 supports the drawer 80 by guide rails (not shown) such that the drawer 80 is movable forward from the mounted position.

The drawer 80 is movable between the mounted position indicated by the solid line in FIG. 1 and a pulled-out position indicated by the two-dot chain line in FIG. 1 in a state where the front cover 9F is swingably moved to the position indicated by the two-dot chain line in FIG. 1 to open the opening 9H.

Figure 2:
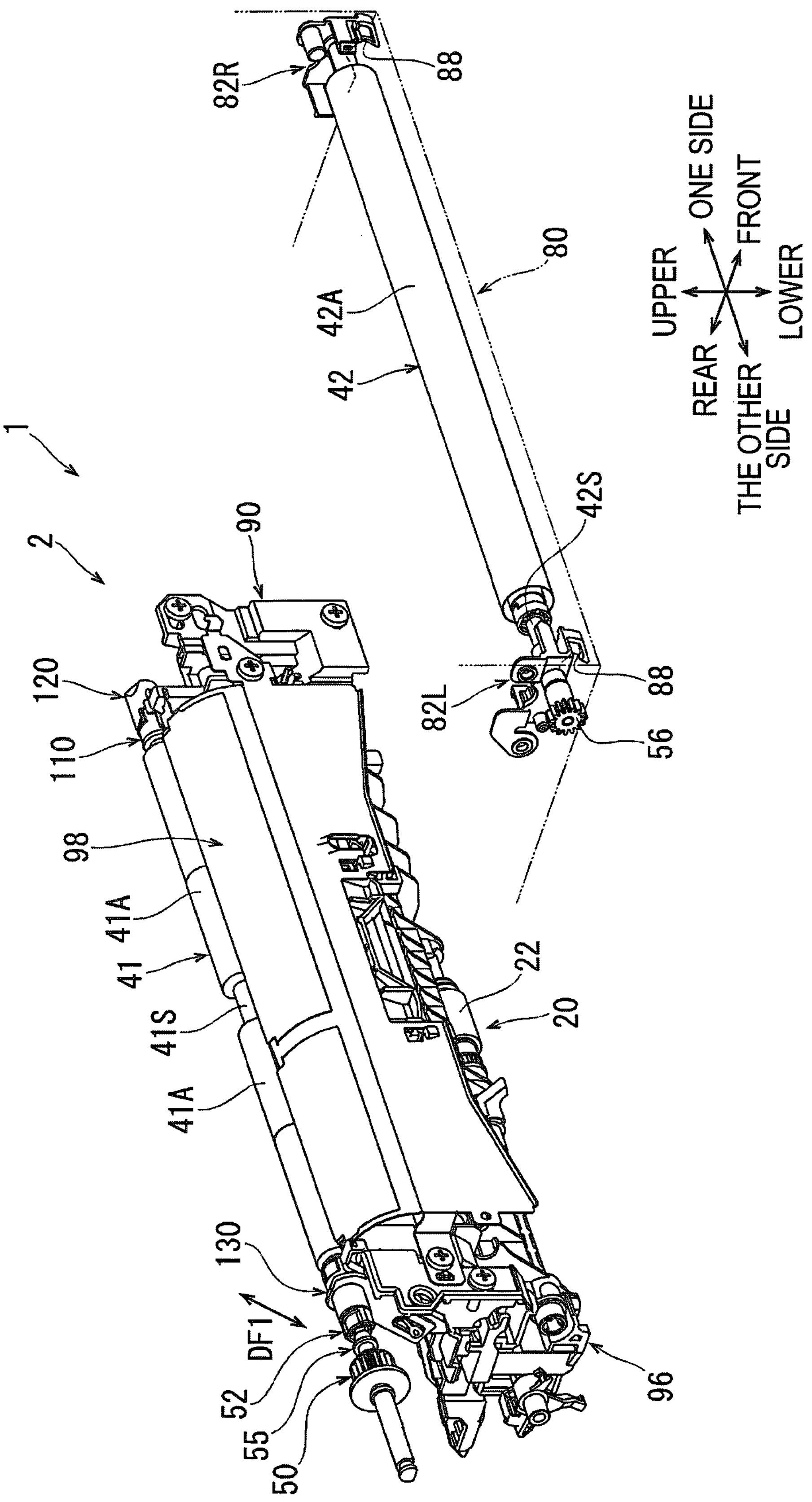

The pulled-out position of the drawer 80 is the position where the drawer 80 is pulled out forward from the mounted position. When the drawer 80 is in the pulled-out position and detached from the apparatus main body 9, maintenance work such as removing jammed sheet SH in the conveyance path P1 and replacing consumables is performed. Although not shown, when the drawer 80 is in the pulled-out position and not detached from the apparatus main body 9, each toner cartridge 3C is replaced. The drawer 80 shown in FIG. 2 is also at the pulled-out position.

As shown in FIG. 1, the transfer belt 6 is located below the photosensitive drums 5 via the substantially horizontally extending portion of the conveyance path P1. The transfer belt 6 circulates while sandwiching the conveyed sheet SH together with the photosensitive drums 5.

The scanner unit 8 is located above the photosensitive drums 5 and the toner cartridges 3C. The scanner unit 8 includes a laser light source, a polygon mirror, an fθ lens, a reflecting mirror, and so on. The scanner unit 8 irradiates each photosensitive drum 5 with a laser beam from above.

In the drawer 80, the surface of each photosensitive drum 5 is uniformly positively charged by the charger 3F as the photosensitive drum 5 rotates, and then exposed by high-speed scanning of the laser beam irradiated from the scanner unit 8. As a result, an electrostatic latent image corresponding to the image to be formed on the sheet SH is formed on the surface of each photosensitive drum 5.

Then, the development roller 3E supplies the toner stored in the toner storage portion 3G to the surface of the photosensitive drum 5 in accordance with the electrostatic latent image, forming a toner image. Then, the first roller 41 and the second roller 42 convey the sheet SH toward each photosensitive drum 5, and when the sheet SH passes between each photosensitive drum 5 and the transfer belt 6, the upward surface of the sheet SH faces each photosensitive drum 5. The toner image borne on the surface of each photosensitive drum 5 is transferred to the upward surface of the sheet SH.

The fixing unit 7 is located rearward of the drawer 80. The fixing unit 7 heats and presses the sheet SH while conveying the sheet SH with the sheet SH sandwiched between a heating roller 7A and a pressure roller 7B, and thermally fixes the toner image on the sheet SH.

The discharge roller pair 29 is disposed at the downstream end of a discharge path P2. The discharge path P2 is a path that guides the sheet SH that has passed through the fixing unit 7 upward, and then makes a U-turn so that the surface on which the image is formed faces downward, and discharges the sheet SH onto the discharge tray 9T. The discharge roller pair 29 nips the sheet SH that is conveyed along the discharge path P2 and discharges the sheet SH onto the discharge tray 9T.

Figure 3:
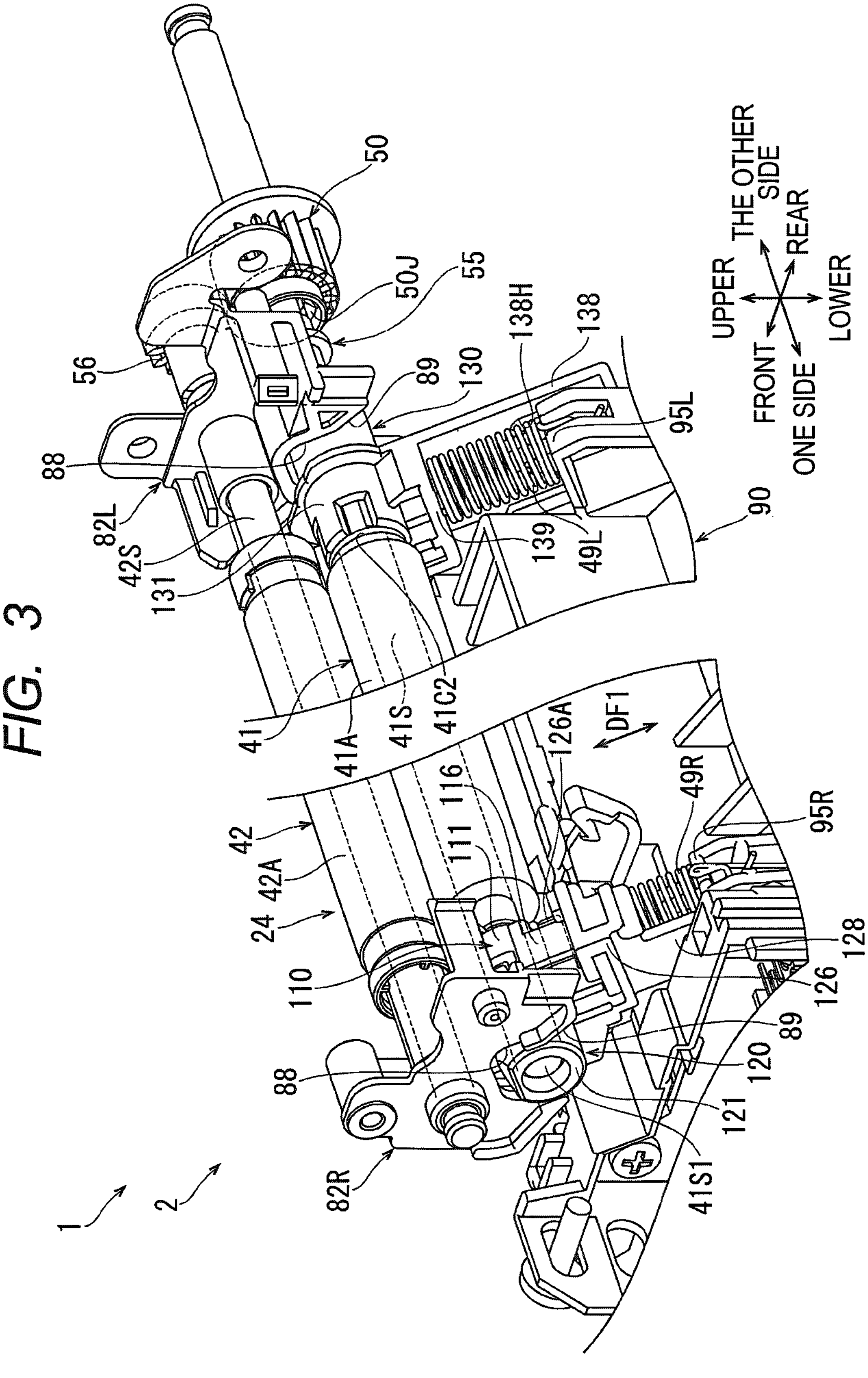
Figure 4:
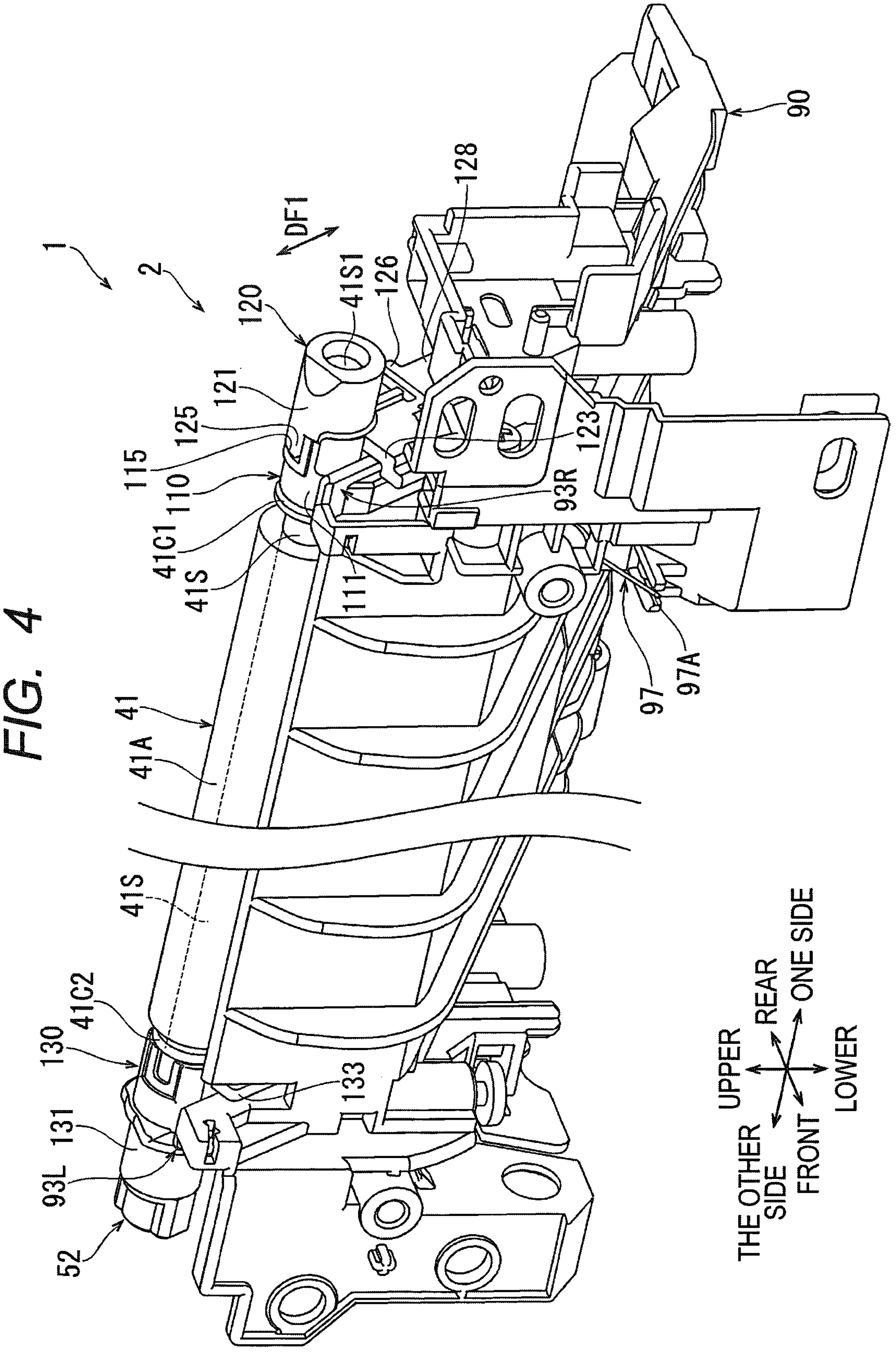
Figure 5:
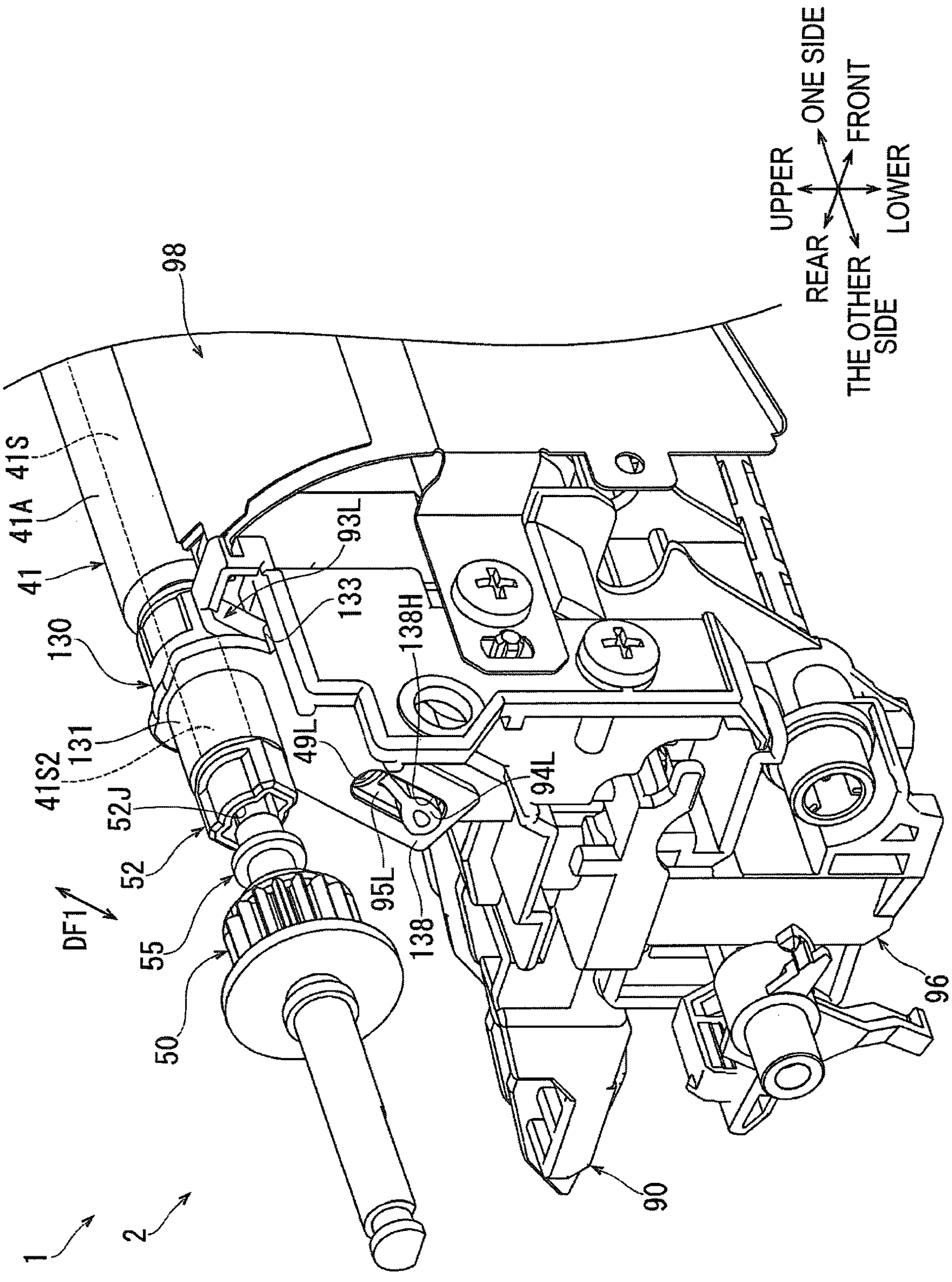
Figure 6:
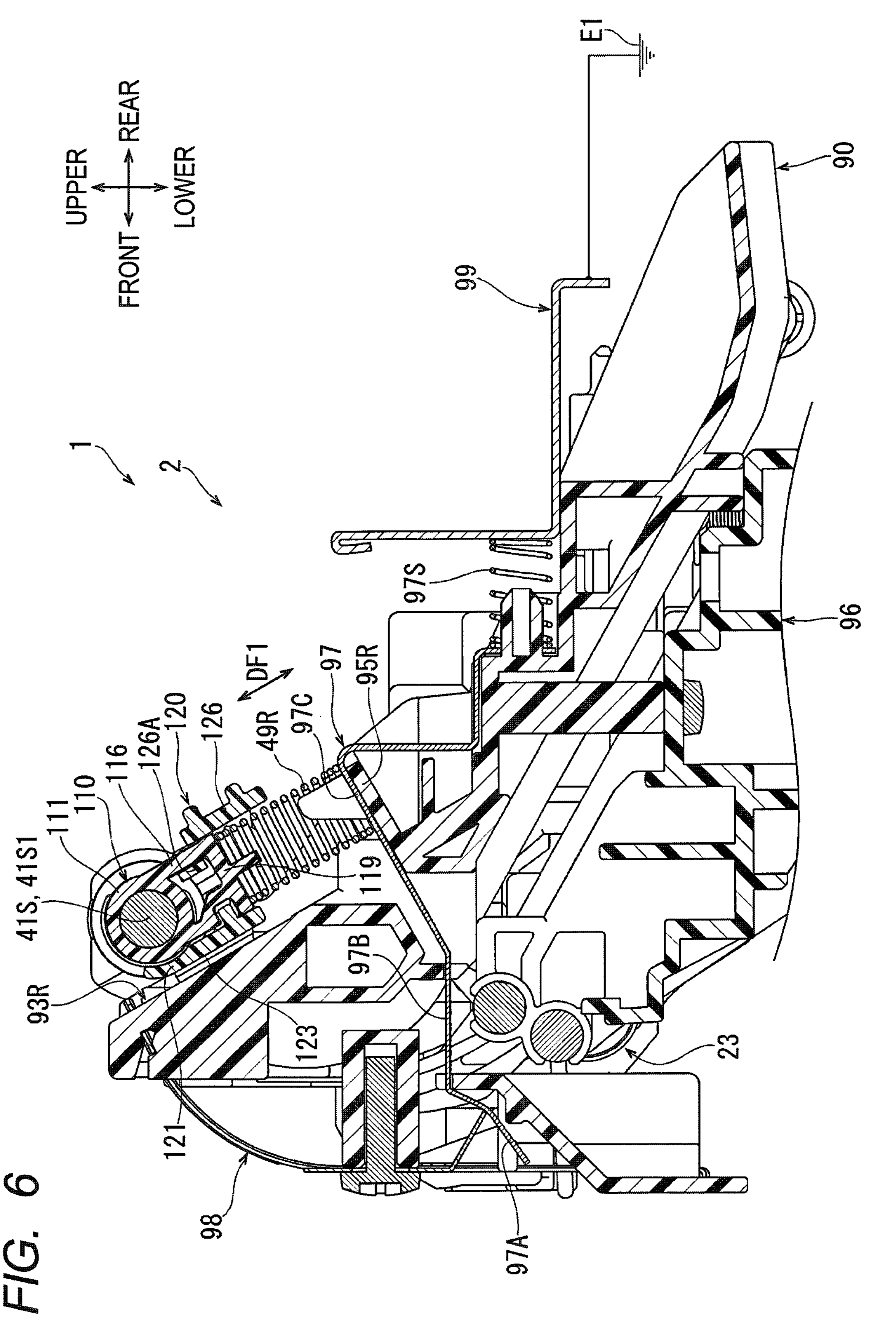
FIG. 6 is a partial cross-sectional view including sections of the first and second bearing, showing a grounding path of the first roller and the chute metal plate.

The sheet conveyor 2 includes the first roller 41 shown in FIGS. 2 to 10, the second roller 42 shown in FIGS. 2 and 3, a frame 90 shown in FIGS. 2 to 6, 9 and 10, and a chute metal plate 98 shown in FIGS. 2, 5 and 6.

The sheet conveyor 2 also includes a first bearing 110 and a second bearing 120 shown in FIGS. 2 to 4 and 6 to 9, and a third bearing 130 shown in FIGS. 2 to 5, 7, 8 and 10.

The sheet conveyor 2 further includes a compression coil spring 49L shown in FIGS. 3, 7, 8 and 10 and a compression coil spring 49R shown in FIGS. 3, 6 to 9. The compression coil springs 49L and 49R are the same part and are made of a metal wire that is a conductive material. The compression coil spring 49R located on one side in the width direction is an example of "spring" (urging means).

Figure 7:
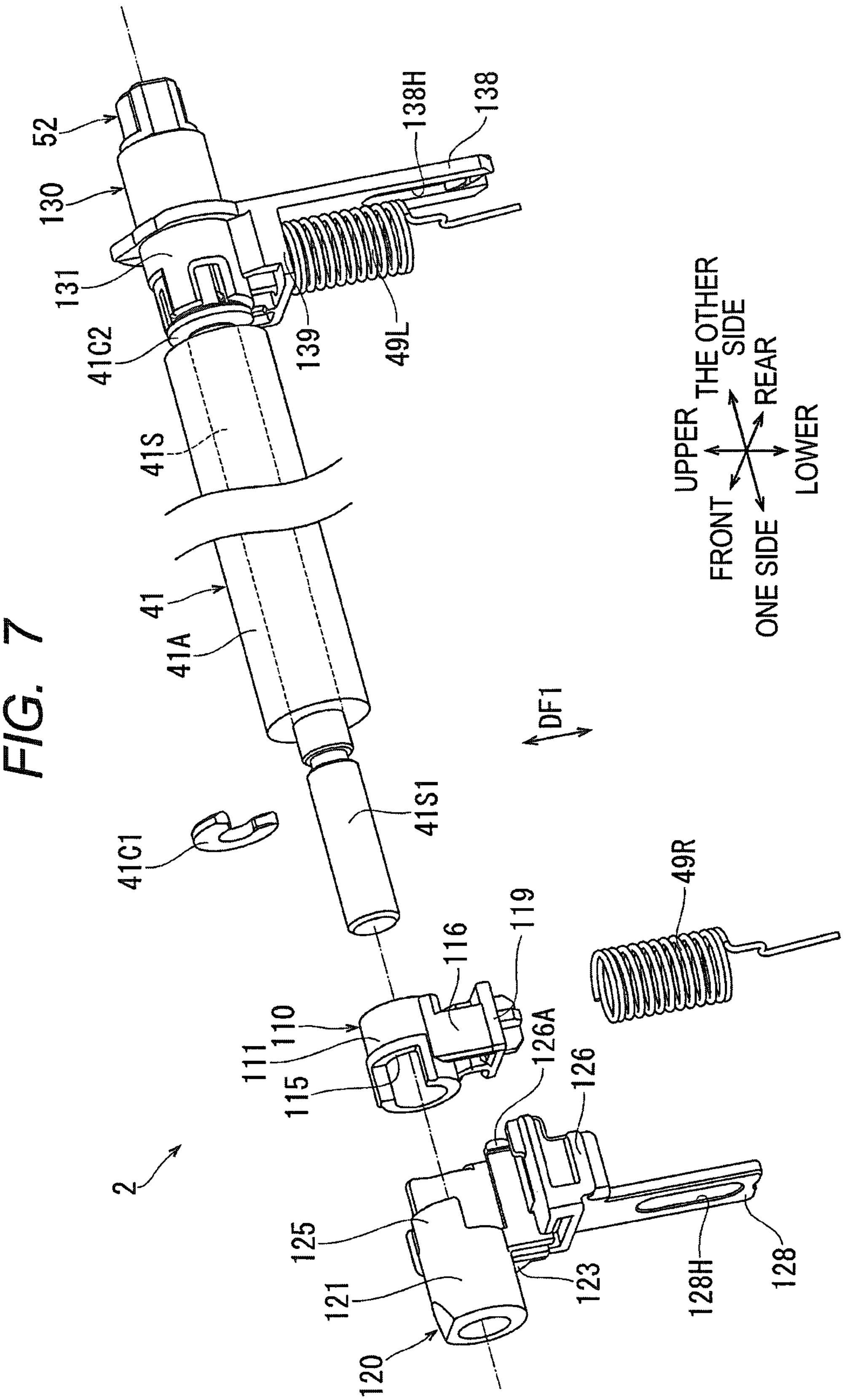
FIG. 7 is a partial perspective view showing the first roller, the first to third bearings, and so on, showing a part thereof in an exploded manner.
Figure 9:
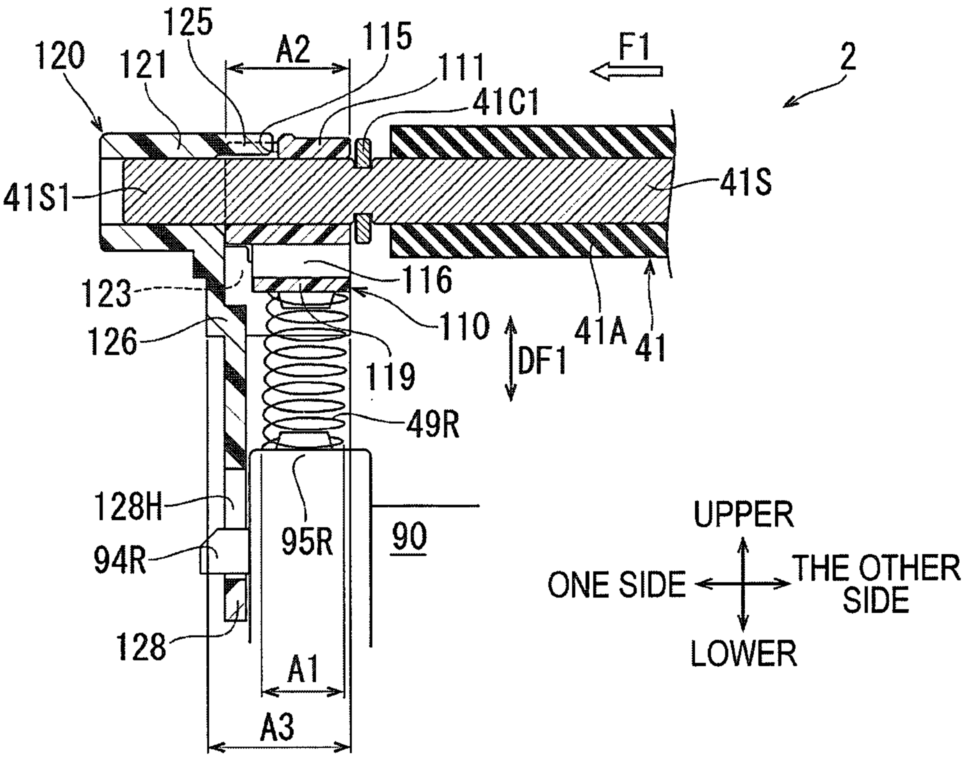

As shown in FIGS. 7 and 9, the first roller 41 includes a rotation shaft 41S and a roller body 41A. The rotation shaft 41S is a metal cylinder extending in the width direction. The roller body 41A is a cylindrical body fixed to the rotation shaft 41S.

A first end portion 41S1 on one side of the rotation shaft 41S protrudes farther to one side in the width direction than the roller body 41A. The rotation shaft 41S includes a C-shaped retaining ring 41C1. The C-shaped retaining ring 41C1 is located near the roller body 41A at the first end portion 41S1 of the rotation shaft 41S and is fitted into a groove that is recessed all around. The C-shaped retaining ring 41C1 protrudes radially farther outward than the rotation shaft 41S. The C-shaped retaining ring 41C1 is an example of "protrusion". The support structure of the first end portion 41S1 of the rotation shaft 41S will be described later.

Figure 10:
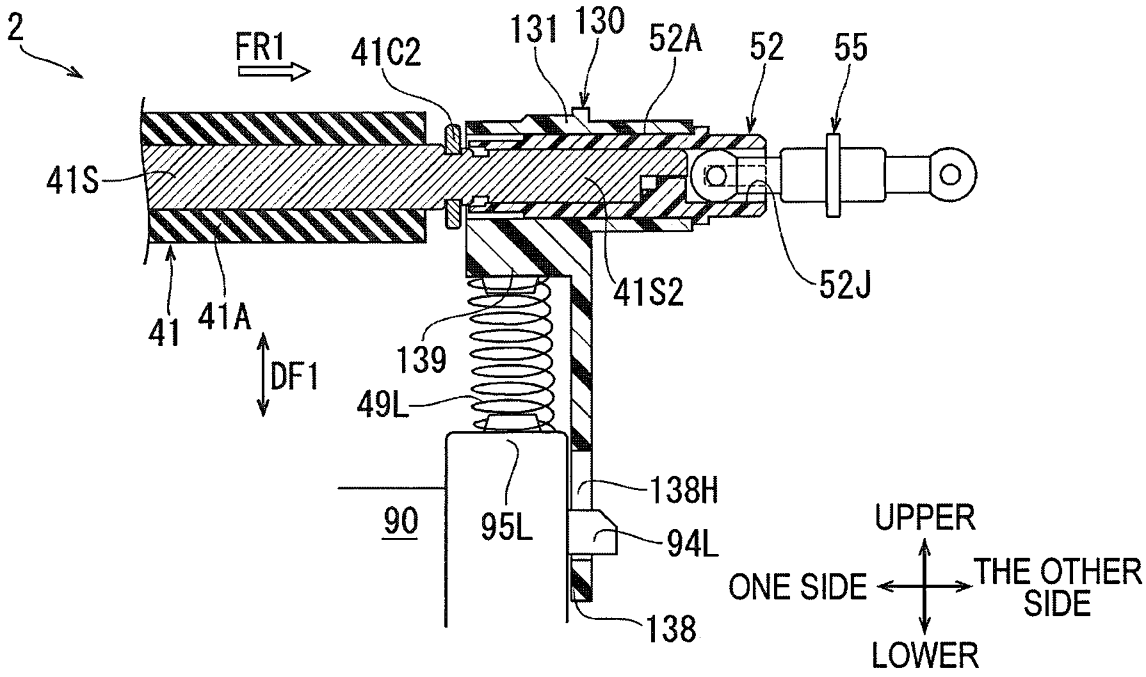

As shown in FIG. 10, a second end portion 41S2 on the other side of the rotation shaft 41S protrudes farther to the other side in the width direction than the roller body 41A. The rotation shaft 41S includes a C-shaped retaining ring 41C2. The C-shaped retaining ring 41C2 is located near the roller body 41A at the second end portion 41S2 of the rotation shaft 41S and is fitted into a groove that is recessed all around. The C-shaped retaining ring 41C2 protrudes radially farther outward than the rotation shaft 41S. The support structure of the second end portion 41S2 of the rotation shaft 41S will be described later.

The portion of the second end portion 41S2 located on the other side of the C-shaped retaining ring 41C2 in the width direction is fitted into a coupling 52. The coupling 52 has a cylindrical outer peripheral surface 52A and a connecting portion 52J located on the other side of the outer peripheral surface 52A in the width direction. One end of a joint shaft 55 in the width direction is connected to the connecting portion 52J.

As shown in FIG. 3, the other end of the joint shaft 55 in the width direction is connected to a connecting portion 50J formed integrally with a drive gear 50. The driving force of a driving motor (not shown) is transmitted to the rotation shaft 41S via the connecting portion 50J of the drive gear 50, the joint shaft 55, and the coupling 52, so that the first roller 41 rotates.

As shown in FIG. 2, the drawer 80 includes second roller bearings 82L and 82R. The second roller bearing 82R is located at one corner in the width direction at the front and lower sides of the drawer 80. The second roller bearing 82L is located at the other corner in the width direction at the front and lower sides of the drawer 80.

The drawer 80 is not shown in FIG. 3, but the positions of the second roller bearings 82L and 82R shown in FIG. 3 correspond to the drawer 80 at the mounted position.

As shown in FIG. 2 and FIG. 3, the second roller 42 includes a second roller rotation shaft 42S and a second roller body 42A. The second roller rotation shaft 42S is a metal cylinder extending in the width direction. The second roller body 42A is a cylindrical body fixed to the second roller rotation shaft 42S in a state where both ends in the width direction of the second roller rotation shaft 42S are exposed.

The second roller 42 is rotatably supported by the drawer 80 by the second roller bearings 82L and 82R supporting both ends of the second roller rotation shaft 42S in the width direction.

A transmission gear 56 is fixed to a portion of the second roller rotation shaft 42S that protrudes farther to the other side in the width direction than the second roller bearing 82L. As shown in FIG. 3, in a state where the drawer 80 is at the mounted position, the transmission gear 56 engages with the drive gear 50, and the second roller 42 faces the first roller 41 from above at a position shifted forward from the first roller 41.

The direction in which the second roller 42 faces the first roller 41 is a facing direction DF1 that is perpendicular to the width direction and inclined with respect to a vertical direction (upper-lower direction). The facing direction DF1 is an example of "second direction".

The driving force of a drive motor (not shown) is transmitted to the second roller rotation shaft 42S via the drive gear 50 and the transmission gear 56, so that the second roller 42 rotates in synchronization with the first roller 41.

As shown in FIG. 2, the second roller 42 moves forward away from the first roller 41 when the drawer 80 moves from the mounted position to the pulled-out position.

As shown in FIG. 3, the second roller bearings 82L and 82R have a holding portion 88 and a releasing portion 89.

The holding portion (holding surface) 88 is a recessed surface that is formed in a portion of the second roller bearings 82L and 82R located on the lower and rear sides of the second roller rotation shaft 42S, and is recessed upward and slightly forward toward the second roller rotation shaft 42S. The holding portion 88 is recessed in the facing direction DF1.

The releasing portion (releasing surface) 89 is an inclined surface that is connected to the rear and lower end of the holding portion 88 and extends rearward and downward. The releasing portion 89 is a surface facing downward and forward (that is, in a direction in which the drawer 80 is pulled out).

As shown in FIG. 4, the frame 90 is a resin molded product that constitutes a part of a plurality of internal frames provided in the apparatus main body 9, and extends in the width direction. One end of the frame 90 in the width direction is connected to a side frame (not shown) located on one side of the apparatus main body 9 in the width direction. The other end of the frame 90 in the width direction is connected to another side frame (not shown) located on the other side of the apparatus main body 9 in the width direction.

As shown in FIGS. 2, 5 and 6, a feed frame 96 is located below the frame 90. The feed frame 96 is also a resin molded product that constitutes a part of the plurality of internal frames provided in the apparatus main body 9, and extends in the width direction.

As shown in FIG. 6, the feed frame 96 is fixed to the frame 90 and rotatably supports one roller of the conveyance roller pair 23. As shown in FIG. 2, the feed frame 96 rotatably supports the separation roller 22.

As shown in FIGS. 2, 5 and 6, the chute metal plate 98 is formed of a metal plate material and is located in front of the frame 90 and extends in the width direction. Plate-like pieces are formed on one and the other edges in the width direction of the chute metal plate 98, and these plate-like pieces are fixed to one and the other ends in the width direction of the frame 90. The chute metal plate 98 extends vertically upward from its lower edge and then curves rearward. The upper edge of the chute metal plate 98 is located near the upper end of the roller body 41A.

The chute metal plate 98 guides the sheet SH conveyed by the conveyance roller pair 23 toward the first roller 41 and the second roller 42.

As shown in FIG. 4, the frame 90 includes rails 93L and 93R. The rails 93L and 93R are located on the outer side of the roller body 41A of the first roller 41 in the width direction.

As shown in FIGS. 4 and 6, the rail 93R located on one side in the width direction extends upward and slightly forward along the facing direction DF1 from a position below the first end portion 41S1 of the rotation shaft 41S. The upper end of the rail 93R is located in front of the first end portion 41S1 of the rotation shaft 41S.

As shown in FIG. 5, the rail 93L located on the other side in the width direction has substantially the same shape, but mirrored as the rail 93R located on one side in the width direction. The rail 93L extends upward and slightly forward along the facing direction DF1 from a position below the second end portion 41S2 of the rotation shaft 41S. The upper end of the rail 93L is located in front of the second end portion 41S2 of the rotation shaft 41S.

As shown in FIG. 3, the frame 90 includes spring bases 95L and 95R. The spring bases 95L and 95R are located on the outer side of the roller body 41A of the first roller 41 in the width direction.

As shown in FIGS. 3 and 6, the spring base 95R located on one side in the width direction is located at the rear of the rail 93R. The spring base 95R engages with the lower end of the compression coil spring 49R. As shown in FIG. 9, a guide protrusion 94R is formed on the side surface of the spring base 95R facing one side in the width direction so as to protrude to one side in the width direction.

As shown in FIG. 3, the spring base 95L located on the other side in the width direction has substantially the same shape, but mirrored as the spring base 95R located on one side in the width direction. The spring base 95L is located at the rear of the rail 93L. The spring base 95L engages with the lower end of the compression coil spring 49L. As shown in FIG. 5 and FIG. 10, a guide protrusion 94L is formed on the side surface of the spring base 95L facing the other side in the width direction so as to protrude to the other side in the width direction.

Figure 8:
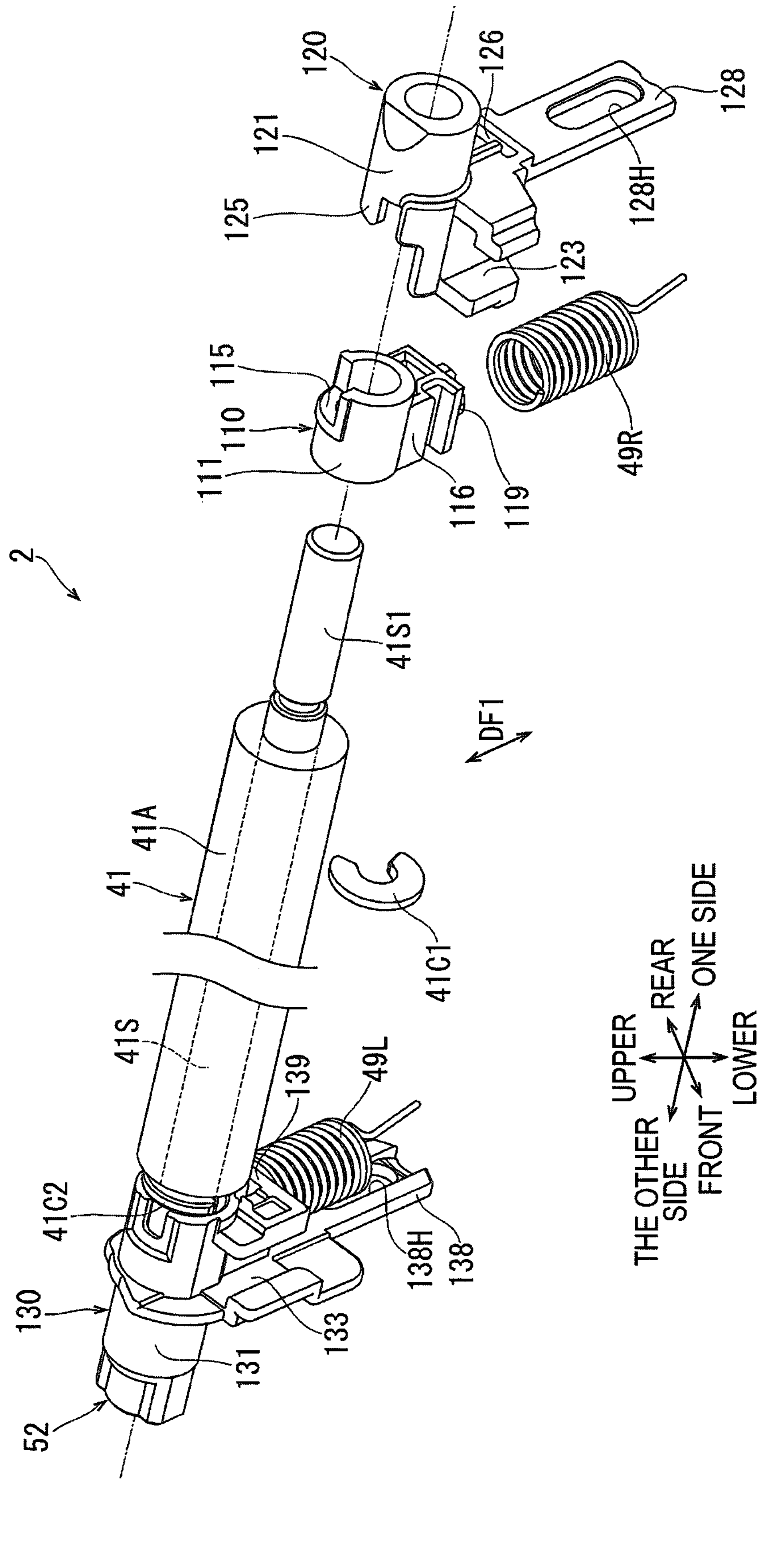
FIG. 8 is a partial perspective view showing the first roller, the first to third bearings, and so on, showing a part thereof in an exploded manner.

As shown in FIG. 7 and FIG. 8, the first bearing 110 is one member having a first bearing body 111, and an engagement portion 119 and an intermediate portion 116 formed integrally with the first bearing body 111.

The first bearing 110 is formed of a conductive resin. In this embodiment, the first bearing 110 is formed of a thermoplastic resin containing a conductive filler such as carbon black or metal powder. The toughness of the conductive resin tends to be lower than that of the thermoplastic resin before the conductive filler is mixed therein. The toughness represents a material's property of resisting breaking by deforming or absorbing energy. In other words, the toughness represents the property of being difficult to break against an external force. The toughness of the conductive resin is lower than that of polyacetal resin (POM)

described later, so that the conductive resin is brittle and easily broken by an external force.

The first bearing body 111 is cylindrical with an inner diameter slightly larger than the outer diameter of the first end portion 41S1 of the rotation shaft 41S. The engagement portion 119 is located below the first bearing body 111. The intermediate portion 116 connects the first bearing body 111 and the engagement portion 119.

As shown in FIGS. 6 and 9, the first end portion 41S1 of the rotation shaft 41S is inserted in the first bearing body 111. The engagement portion 119 engages the upper end of the compression coil spring 49R. The upper end of the compression coil spring 49R is an example of "one end of spring (biasing means)". A hole (cavity) is formed in the intermediate portion 116, and the hole is formed to penetrate the intermediate portion 116 in the width direction.

As shown in FIGS. 7 and 8, the first bearing body 111 has a fitting recess 115. The fitting recess 115 is recessed from an upper portion of an end surface located at one side in the width direction of the first bearing body 111 toward the other side in the width direction.

The second bearing 120 is one member having a second bearing body 121, a restricted portion 123, a plate-like piece 128, and an intermediate portion 126 that are integrally formed with the second bearing body 121.

The second bearing 120 is made of a non-conductive resin, which is a material with higher toughness than the first bearing 110. In this embodiment, the second bearing 120 is made of polyacetal resin (POM) that does not contain conductive filler. Polyacetal resin (POM) is an engineering plastic with excellent sliding properties, toughness, and fatigue properties.

The second bearing body 121 is cylindrical with an inner diameter slightly larger than the outer diameter of the first end portion 41S1 of the rotation shaft 41S. The second bearing body 121 includes a fitting protrusion 125. The fitting protrusion 125 protrudes toward the other side in the width direction from an upper portion of the end surface located at the other side in the width direction of the second bearing body 121. The fitting protrusion 125 protrudes in the width direction so as to fit into the fitting recess 115 of the first bearing body 111.

The restricted portion 123 is located on the other side in the width direction and in front of the second bearing body 121, and is also located slightly below the second bearing body 121 (see FIG. 8). The restricted portion 123 is generally "C"-shaped when viewed along the facing direction DF1, and opens forward. The front end of the restricted portion 123 located on one side in the width direction is bent toward the other side in the width direction.

The intermediate portion 126 connects the second bearing body 121 and the restricted portion 123. As shown in FIG. 7, the intermediate portion 126 includes an engagement protrusion 126A. The engagement protrusion 126A protrudes in a cantilever shape toward the other side in the width direction, and its tip is shaped like a hook.

The plate-like piece 128 is connected to the end located on the bottom of the intermediate portion 126 and located on one side in the width direction, and protrudes downward. The plate-like piece 128 has a long hole 128H that is long in the facing direction DF1.

As shown in FIG. 9, the second bearing body 121 is located on one side of the first bearing body 111 of the first bearing 110 in the width direction, and the first end portion 41S1 of the rotation shaft 41S is inserted in the second bearing body 121. In other words, the first bearing body 111 of the first bearing 110 is located between the second bearing body 121 of the second bearing 120 and the C-shaped retaining ring 41C1 in the width direction.

The fitting recess 115 fits with the fitting protrusion 125 of the second bearing body 121 to restrict relative rotation of the first bearing body 111 and the second bearing body 121 about the rotation shaft 41S.

As shown in FIG. 6, the engagement protrusion 126A passes through the hole in the intermediate portion 116 of the first bearing body 111. As shown in FIG. 3, the engagement protrusion 126A maintains the first bearing body 111 and the second bearing body 121 in a contact state in the width direction by engaging the hook at the tip with the other end surface of the intermediate portion 116 in the width direction.

As shown in FIG. 4, the restricted portion 123 holds the rail 93R of the frame 90. The rail 93R restricts the movement of the restricted portion 123 in the width direction and in the direction perpendicular to the width direction and the facing direction DF1.

As shown in FIG. 9, the plate-like piece 128 is adjacent to the spring base 95R from one side in the width direction, and the guide protrusion 94R is inserted in the long hole 128H.

In this way, the frame 90 supports the second bearing 120 with the aid of the rail 93R and the guide protrusion 94R such that the second bearing 120 is movable in the facing direction DF1.

The first bearing 110 and the second bearing 120 support the first end portion 41S1 of the rotation shaft 41S. When the second bearing 120 moves in the facing direction DF1, the first bearing 110 and the first end portion 41S1 also move in the facing direction DF1 together with the second bearing 120.

The compression coil spring 49R urges the first bearing 110 in a direction in which the first roller 41 presses the second roller 42, that is, in a direction along the facing direction DF1.

As shown in FIG. 3, the holding portion 88 of the second roller bearing 82R holds the second bearing body 121 of the second bearing 120 so as to be movable in the facing direction DF1 in a state where the drawer 80 is at the mounted position.

When the drawer 80 starts to move from the mounted position to the pulled-out position, the releasing portion 89 of the second roller bearing 82R presses the second bearing body 121 of the second bearing 120 downward to release pressing of the first roller 41 against the second roller 42.

As shown in FIG. 9, the range in the width direction in which the compression coil spring 49R exists is defined as a range A1. The range in the width direction in which the first bearing 110 exists is defined as a range A2. The range in the width direction in which the restricted portion 123 of the second bearing 120 exists is defined as a range A3. The range A2 includes the entire range A1, and the range A3 includes the entire ranges A1 and A2. In other words, the first bearing 110 and the restricted portion 123 of the second bearing 120 are at the same position in the width direction.

As shown in FIGS. 7 and 8, the third bearing 130 is one member having a third bearing body 131, and an engagement portion 139, a restricted portion 133, and a plate-like piece 138, which are integrally formed with the third bearing body 131.

The third bearing 130 is made of a non-conductive resin, which is a material with higher toughness than the first bearing 110. In this embodiment, the third bearing 130 is made of polyacetal resin (POM) that does not contain conductive filler, similar to the second bearing 120.

As shown in FIG. 10, the third bearing body 131 is cylindrical with an inner diameter slightly larger than the outer diameter of the outer peripheral surface 52A of the coupling 52 into which the second end portion 41S2 of the rotation shaft 41S is fitted. The engagement portion 139 is located below the third bearing body 131 and is connected to the third bearing body 131.

As shown in FIG. 8, the restricted portion 133 is connected to the third bearing body 131 at a position in front of and slightly below the third bearing body 131. The restricted portion 133 is substantially "C"-shaped when viewed along the facing direction DF1 and opens forward. The front end of the restricted portion 133 located on the other side in the width direction is bent toward one side in the width direction.

As shown in FIG. 8 and FIG. 10, the plate-like piece 138 is connected to an end of the engagement portion 139 located on the bottom and on the other side in the width direction and protrudes downward. The plate-like piece 138 has a long hole 138H in the facing direction DF1.

As shown in FIG. 10, the second end portion 41S2 of the rotation shaft 41S is inserted in the third bearing body 131, with the coupling 52 interposed between the second end portion 41S2 and the third bearing body 131. The engagement portion 139 engages with the upper end of the compression coil spring 49L.

As shown in FIG. 5, the restricted portion 133 holds the rail 93L of the frame 90. The rail 93L restricts the movement of the restricted portion 133 in the width direction and in the direction perpendicular to the width direction and the facing direction DF1.

As shown in FIG. 10, the plate-like piece 138 is adjacent to the spring base 95L from the other side in the width direction, and the guide protrusion 94L is inserted in the long hole 138H.

In this way, the frame 90 supports the third bearing 130 with the aid of the rail 93L and the guide protrusion 94L such that the third bearing 130 is movable in the facing direction DF1.

The third bearing 130 supports the second end portion 41S2 of the rotation shaft 41S. When the third bearing 130 moves in the facing direction DF1, the second end portion 41S2 also moves in the facing direction DF1 together with the third bearing 130.

The compression coil spring 49L urges the third bearing 130 in a direction in which the first roller 41 presses the second roller 42, that is, in a direction along the facing direction DF1.

As shown in FIG. 3, the holding portion 88 of the second roller bearing 82L holds the third bearing body 131 of the third bearing 130 so as to be movable in the facing direction DF1 in a state where the drawer 80 is at the mounted position.

When the drawer 80 starts to move from the mounted position to the pulled-out position, the releasing portion 89 of the second roller bearing 82L presses the third bearing body 131 of the third bearing 130 downward to release pressing of the first roller 41 against the second roller 42.

When a user accidentally drops the image forming apparatus 1 including the sheet conveyor 2 while carrying the same, an impact acts on the rotation shaft 41S of the first roller 41, and the rotation shaft 41S may move suddenly.

In this case, as shown in FIG. 9, when the rotation shaft 41S moves to one side in the width direction, a force F1 of the rotation shaft 41S moving in the width direction is transmitted to the first bearing 110 by the C-shaped retaining ring 41C1 moving to one side in the width direction and contacting the first bearing body 111 of the first bearing 110. The second bearing body 121 of the second bearing 120 receives the force F1 of the rotation shaft 41S moving in the width direction via the first bearing body 111 of the first bearing 110.

In other words, when the rotation shaft 41S moves to one side in the width direction, the second bearing 120 receives the force F1 from the rotation shaft 41S moving in the width direction via the first bearing 110 interposed between the rotation shaft 41S and the second bearing 120.

The rail 93R of the frame 90 restricts, via the restricted portion 123, the movement in the width direction of the second bearing 120 that receives the force F1 of the rotation shaft 41S moving in the width direction. As a result, the frame 90 receives the force F1 of the rotation shaft 41S moving in the width direction, via the rail 93R. The frame 90 is a large resin molded product, and thus reliably supports the force F1.

As shown in FIG. 10, in a case where an impact acts on the rotation shaft 41S of the first roller 41 and the rotation shaft 41S moves suddenly, and the rotation shaft 41S moves to the other side in the width direction, a force FR1 acts on the rotation shaft 41S and the C-shaped retaining ring 41C2 moves to the other side in the width direction and contacts the third bearing body 131 of the third bearing 130. The force FR1 is in the opposite direction to the force F1 that the second bearing 120 receives from the rotation shaft 41S.

In other words, the third bearing 130 directly receives the force FR1 in the opposite direction to the force F1 that the second bearing 120 receives from the rotation shaft 41S.

The rail 93L of the frame 90 restricts the movement of the third bearing 130 in the width direction which receives the force FR1, via the restricted portion 133. As a result, the rail 93L of the frame 90 receives the force FR1 that is in the opposite direction to the force F1. The frame 90 is a large resin molded product, and thus reliably supports the force FR1.

As shown in FIG. 6, the sheet conveyor 2 further includes a frame metal plate 99 and ground connecting members 97 and 97S.

The frame metal plate 99 is a reinforcing member formed of a metal plate material and having a substantially "L"-shaped cross-section, and extends in the width direction. Although not shown, one end of the frame metal plate 99 in the width direction is connected to a side frame located on one side of the apparatus main body 9 in the width direction. The other end of the frame metal plate 99 in the width direction is connected to another side frame located on the other side of the apparatus main body 9 in the width direction. The frame metal plate 99 is connected to a ground E1.

The ground connecting member 97 is one member formed of a metal wire and bent at a plurality of points. The ground connecting member 97S is a compression coil spring made of a metal wire. The rear end of the ground connecting member 97S is in contact with the frame metal plate 99. The rear end of the ground connecting member 97 is in contact with the front end of the ground connecting member 97S.

The ground connecting member 97 includes a first portion 97A, a second portion 97B, and a third portion 97C. As shown in FIGS. 4 and 6, the first portion 97A includes the front end of the ground connecting member 97 and protrudes forward and downward from the front surface of the frame 90. As shown in FIG. 6, the first portion 97A contacts the chute metal plate 98. The second portion 97B is connected to the first portion 97A and extends rearward, penetrating the frame 90. The third portion 97C is connected to the second portion 97B and extends rearward and upward, contacting the lower end of the compression coil spring 49R.

In this way, the ground connecting members 97 and 97S contact the frame metal plate 99, the compression coil spring 49R, and the chute metal plate 98, and thus static electricity that accumulates in the first roller 41 and the chute metal plate 98 due to contact with the sheet SH is released to the ground E1.

In the sheet conveyor 2 of the embodiment, as shown in FIG. 6, the first bearing 110 is urged by the compression coil spring 49R in a direction in which the first roller 41 presses the second roller 42, that is, in a direction along the facing direction DF1, and the first bearing 110 performs a function to transmit the urging force of the compression coil spring 49R to the rotation shaft 41S. Thus, the first bearing 110 is easily brought into close contact with the rotation shaft 41S. Thus, the static electricity accumulated in the first roller 41 is reliably released from the rotation shaft 41S to the ground E1 via the first bearing 110, the compression coil spring 49R, the ground connecting members 97 and 97S, and the frame metal plate 99 having conductivity.

As shown in FIGS. 4 and 9, the second bearing 120 is supported by the rail 93R and the guide protrusion 94R of the frame 90 so as to be movable in the facing direction DF1. The second bearing 120 causes the direction in which the first bearing 110 and the rotation shaft 41S move to be the facing direction DF1, and also causes the direction of the urging force of the compression coil spring 49R to be the facing direction DF1.

As shown in FIG. 9, when the rotation shaft 41S moves to one side in the width direction, the C-shaped retaining ring 41C1 moves to one side in the width direction and contacts the first bearing body 111 of the first bearing 110, and thus the force F1 of the rotation shaft 41S moving in the width direction is transmitted to the first bearing 110. The second bearing 120 receives the force F1 of the rotation shaft 41S moving in the width direction, via the second bearing body 121 that contacts the first bearing body 111 of the first bearing 110 in the width direction.

The rail 93R of the frame 90 restricts, via the restricted portion 123, the movement of the second bearing 120 in the width direction when the second bearing 120 receives the force F1 of the rotation shaft 41S moving in the width direction. Accordingly, the rotation shaft 41S is also restricted from moving toward one side in the width direction.

By such a role sharing between the first bearing 110 and the second bearing 120, the sheet conveyor 2 reduces the function to be performed by the first bearing 110, and simplifies the first bearing 110.

When the user accidentally drops the image forming apparatus 1 while carrying the same and an impact acts on the rotation shaft 41S of the first roller 41 and the rotation shaft 41S moves rapidly, the second bearing 120 receives the force F1 of the rotation shaft 41S moving in the width direction via the first bearing 110, and the movement in the width direction is restricted by the rail 93R of the frame 90.

As a result, the sheet conveyor 2 receives the impact transmitted from the rotation shaft 41S by the second bearing 120 and the frame 90 formed of material having higher toughness than the first bearing 110. This suppresses the impact acting on the first bearing 110 which is formed of a conductive resin and thus tend to have low toughness.

Thus, the sheet conveyor 2 of the embodiment releases the static electricity accumulated in the first roller 41 with high reliability, and suppresses the damage of the first bearing 110 when an impact acts on the first roller 41.

In the sheet conveyor 2, as shown in FIG. 10, the third bearing 130 that supports the second end portion 41S2 of the rotation shaft 41S is formed of a material having higher toughness than the first bearing 110. The third bearing 130 receives the force FR1 which is in the opposite direction to the force F1 that the second bearing 120 receives from the rotation shaft 41S. The rail 93L of the frame 90 restricts the movement of the third bearing 130 in the width direction when the third bearing 130 receives the force FR1. With this configuration, when an impact acts on the rotation shaft 41S of the first roller 41 and the rotation shaft 41S moves rapidly, the impact transmitted from the rotation shaft 41S is received by the third bearing 130 configured to receive the force FR1 that is in the opposite direction to the force F1 that the second bearing 120 receives from the rotation shaft 41S.

In the sheet conveyor 2, as shown in FIG. 4, the second bearing 120 includes the restricted portion 123 whose widthwise movement is restricted by the rail 93R of the frame 90. As shown in FIG. 9, the range A2 in which the first bearing 110 exists in the width direction includes the entire range A1 in which the compression coil spring 49R exists in the width direction. The range A3 in which the restricted portion 123 of the second bearing 120 exists in the width direction includes the entire ranges A1 and A2. That is, the first bearing 110 and the restricted portion 123 of the second bearing 120 are located at the same position in the width direction. The second bearing 120 is supported by the rail 93R of the frame 90 so as to be movable in the facing direction DF1. Thus, when the urging force of the compression coil spring 49R is transmitted to the first bearing 110 and is transmitted from the first bearing 110 to the rotation shaft 41S, the urging force of the compression coil spring 49R is applied in the facing direction DF1. Further, the second bearing 120, which receive the force F1 of the rotation shaft 41S moving in the width direction, is restricted from moving in the width direction by the rail 93R of the frame 90, and thus the rotation shaft 41S is also restricted from moving in the width direction. Since the first bearing 110 and the restricted portion 123 of the second bearing 120 are located at the same position in the width direction, the direction of the urging force of the compression coil spring 49R is less likely to be inclined with respect to the facing direction DF1. Thus, the compression coil spring 49R efficiently urges the rotation shaft 41S to move in the facing direction DF1. As a result, the sheet conveyor 2 transmits the urging force of the compression coil spring 49R to the rotation shaft 41S of the first roller 41 with high reliability.

In the sheet conveyor 2, as shown in FIG. 9, the first bearing body 111 of the first bearing 110 is located between the second bearing body 121 of the second bearing 120 and the C-shaped retaining ring 41C1 in the width direction. When the rotation shaft 41S moves to one side in the width direction, the C-shaped retaining ring 41C1 contacts the first bearing body 111 of the first bearing 110. The second bearing body 121 of the second bearing 120 receives the force F1 of the rotation shaft 41S moving in the width direction by contacting the first bearing body 111 of the first bearing 110 which is contacted by the C-shaped retaining ring 41C1. With such a simple configuration, the second bearing 120 receives the force F1 of the rotation shaft 41S moving in the width direction.

In the sheet conveyor 2, as shown in FIGS. 7 and 9, the fitting recess 115 of the first bearing body 111 is fitted to the fitting protrusion 125 of the second bearing body 121, which restricts relative rotation of the first bearing body 111 and the second bearing body 121 about the rotation shaft 41S. With this configuration, the frame 90 reliably restricts the engagement portion 119 of the first bearing 110 from being displaced about the rotation shaft 41S via the rail 93R, the restricted portion 123 and the second bearing body 121 of the second bearing 120, and the first bearing body 111 of the first bearing 110. As a result, the first bearing 110 reliably performs a function of transmitting the urging force of the compression coil spring 49R to the rotation shaft 41S in the facing direction DF1.

In the sheet conveyor 2, as shown in FIG. 6, the ground connecting members 97 and 97S are in contact with the frame metal plate 99 and the compression coil spring 49R. This configuration improves the flexibility of arrangement of the grounding path from the compression coil spring 49R to the frame metal plate 99.

In the sheet conveyor 2, the ground connecting member 97 includes the first portion 97A that contacts the chute metal plate 98 and the second portion 97B that penetrates the frame 90. This configuration suppresses an increase in the length of the grounding path from the chute metal plate 98 to the compression coil spring 49R, compared to a configuration in which the ground connecting member 97 makes a detour around the frame 90 without having the second portion 97B.

In the sheet conveyor 2, the second bearing 120 is formed of a non-conductive resin. This configuration easily realizes that the toughness of the second bearing 120 is higher than the toughness of the first bearing 110.

In the image forming apparatus 1 according to the embodiment, as shown in FIG. 3, the drawer 80 includes the holding portion 88 and the releasing portion 89. The holding portion 88 holds the second bearing body 121 of the second bearing 120 movably in the facing direction DF1 in a state where the drawer 80 is in the mounted position. The releasing portion 89 releases pressing of the first roller 41 against the second roller 42 by pushing the second bearing body 121 of the second bearing 120 when the drawer 80 starts to move from the mounted position to the pulled-out position. With this configuration, the holding portion 88 of the drawer 80 holds the second bearing body 121 of the second bearing 120 formed of a material having higher toughness than the first bearing 110, and the releasing portion 89 of the drawer 80 pushes the second bearing body 121 of the second bearing 120. Thus, the image forming apparatus 1 achieves improved durability compared to a configuration in which the first bearing 110, which is formed of a conductive resin and thus tends to have low toughness, is held by the holding portion 88 of the drawer 80 and is pushed by the releasing portion 89 of the drawer 80.

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosure, and not limiting the disclosure. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described disclosure are provided below.

Figure 11:
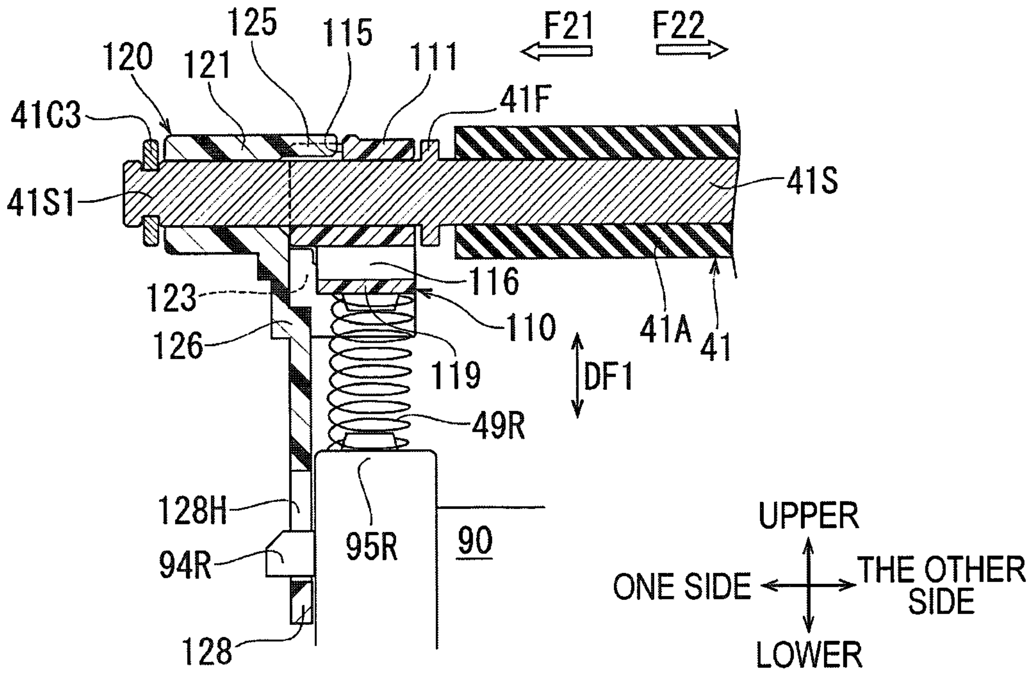
FIG. 11 is a partial cross-sectional view taken along line A-A in FIG. 1, showing a first roller, first and second bearings, a compression coil spring, a frame, and so on, in an image forming apparatus.

As shown in FIG. 11, in a sheet conveyor of a first modification, a flange 41F is integrally formed at the first end portion 41S1, instead of fitting the C-shaped retaining ring 41C1 to the first end portion 41S1 according to the sheet conveyor 2 of the embodiment. The flange 41F is located between the roller body 41A and the first bearing body 111 and protrudes radially farther outward than the first end portion 41S1. The flange 41F is an example of "protrusion" in the present disclosure.

In the sheet conveyor, the first end portion 41S1 according to the embodiment is extended to protrude to one side in the width direction from the second bearing body 121, and a C-shaped retaining ring 41C3 is fitted to the protruding portion. The C-shaped retaining ring 41C3 is an example of "protrusion" in the present disclosure. The C-shaped retaining ring 41C2 fitted to the second end portion 41S2 according to the embodiment may be left as it is or may be removed.

The other configurations of the first modification are the same as those of the embodiment. Thus, the same components as those of the embodiment are denoted by the same reference numerals, and the description thereof will be omitted or simplified.

When the rotation shaft 41S moves to one side in the width direction, a force F21 is transmitted from the rotation shaft 41S moving to one side in the width direction to the first bearing 110, by the flange 41F moving to one side in the width direction and contacting the first bearing body 111 of the first bearing 110. The second bearing body 121 of the second bearing 120 receives the force F21 of the rotation shaft 41S moving in the width direction by contacting the first bearing body 111 of the first bearing 110 in the width direction.

When the rotation shaft 41S moves to the other side in the width direction, a force F22 is transmitted from the rotation shaft 41S moving in the width direction to the second bearing 120 by the C-shaped retaining ring 41C3 moving to the other side in the width direction and contacting the second bearing body 121 of the second bearing 120. The force F22 is in the opposite direction to the force F21. That is, the second bearing 120 directly receives the force F22 of the rotation shaft 41S moving in the width direction.

The sheet conveyor of the first modification having such a configuration also achieves operations and effects similar to those of the sheet conveyor 2 of the embodiment.

Figure 12:
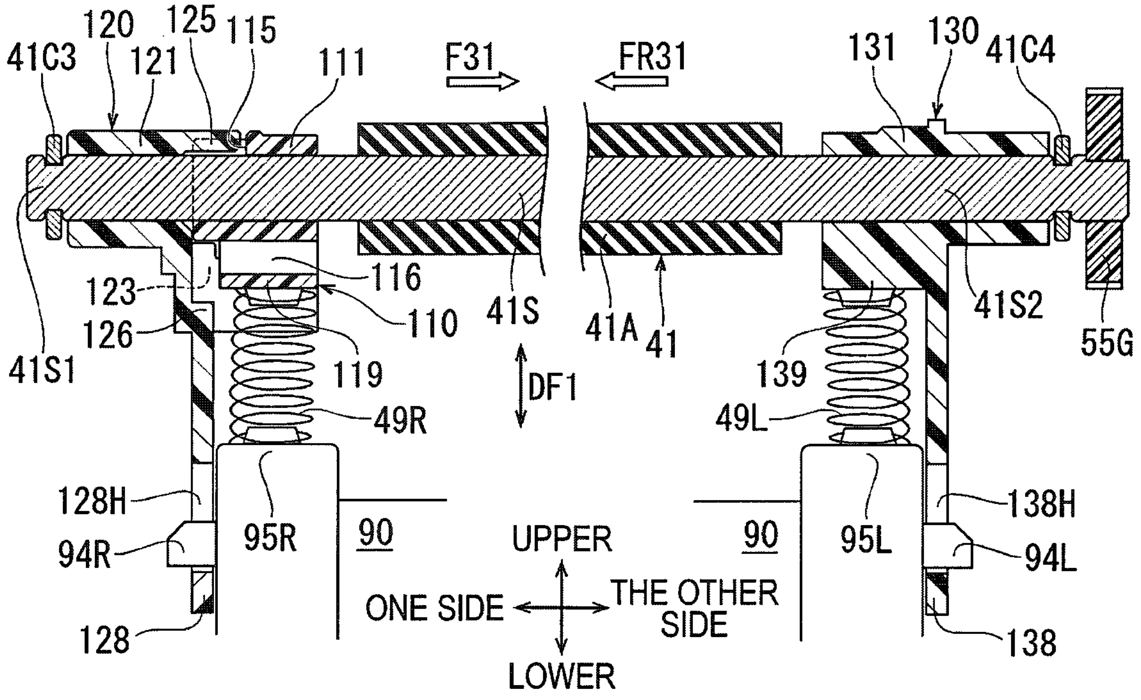
FIG. 12 is a partial cross-sectional view taken along line A-A of FIG. 1, showing a first roller, first to third bearings, a compression coil spring, a frame, and so on, in an image forming apparatus.

As shown in FIG. 12, in a sheet conveyor of a second modification, the C-shaped retaining ring 41C1 fitted to the first end portion 41S1 according to the sheet conveyor 2 of the embodiment is removed. The first end portion 41S1 is extended to protrude from the second bearing body 121 to one side in the width directions, and the C-shaped retaining ring 41C3 is fitted to the protruding portion. The C-shaped retaining ring 41C3 is an example of "protrusion" in the present disclosure.

In the sheet conveyor, the coupling 52 is removed from the second end portion 41S2 according to the embodiment, and the third bearing body 131 of the third bearing 130 directly supports the second end portion 41S2.

In this sheet conveyor, a transmission gear 55G is fixed to the second end portion 41S2, and the driving force of the driving motor (not shown) is transmitted to the rotation shaft 41S via the transmission gear 55G.

In this sheet conveyor, a C-shaped retaining ring 41C4 is fitted to a position of the second end portion 41S2 between the third bearing body 131 and the transmission gear 55G.

The other configurations of the second modification are the same as those of the embodiment. Thus, the same components as those of the embodiment are denoted by the same reference numerals, and the description thereof will be omitted or simplified.

When the rotation shaft 41S moves to the other side in the width direction, a force F31 is transmitted from the rotation shaft 41S moving to the other side in the width direction to the second bearing 120 by the C-shaped retaining ring 41C3 moving to the other side in the width direction and contacting the second bearing body 121 of the second bearing 120. That is, the second bearing 120 directly receives the force F31 of the rotation shaft 41S moving in the width direction.

When the rotation shaft 41S moves to one side in the width direction, a force FR31 is transmitted from the rotation shaft 41S to the third bearing 130 by the C-shaped retaining ring 41C4 moving to one side in the width direction and contacting the third bearing body 131 of the third bearing 130. The force FR31 is in the opposite direction to the force F31 received by the second bearing 120 from the rotation shaft 41S. That is, the third bearing 130 directly receives force FR31 in the opposite direction to the force F31 received by the second bearing 120 from the rotation shaft 41S.

The sheet conveyor of the second modification having such a configuration also achieves operations and effects similar to those of the sheet conveyor 2 of the embodiment.

In the embodiment, the sheet conveyor of the present disclosure is embodied as the sheet conveyor 2 provided at the image forming apparatus 1, but the present disclosure is not limited to this configuration. For example, the configuration of the present disclosure may be applied to an image scanner (image reading apparatus), or may be applied to a multifunction peripheral including an image scanner at an upper side of an image forming apparatus.

Although the second bearing body 121 has the fitting protrusion 125 and the first bearing body 111 has the fitting recess 115 in the embodiment, the present disclosure is not limited to this configuration. For example, the present disclosure also includes a configuration in which the first bearing body has a fitting protrusion and the second bearing body has a fitting recess.

In the embodiment, the first portion 97A and the second portion 97B of the ground connecting member 97 are continuous, but the present disclosure is not limited to this configuration. For example, the ground connecting member 97 may be divided into the first portion 97A and the second portion 97B. In this case, the first portion 97A may be changed to a coil shape.

What is claimed is:

1. A sheet conveyor comprising:

a first roller including a rotation shaft extending in a first direction;

a second roller facing the first roller in a second direction perpendicular to the first direction, the first roller and the second roller being configured to convey a sheet in cooperation with each other;

a first bearing configured to support a first end portion of the rotation shaft on one side in the first direction, the first bearing being formed of a conductive resin;

a second bearing configured to support the first end portion, the second bearing being formed of a material having higher toughness than the first bearing;

a spring configured to urge the first bearing in a direction in which the first roller presses the second roller, the spring being formed of a conductive material; and a frame configured to support the second bearing to be movable in the second direction, the second bearing being configured to receive a force of the rotation shaft that moves in the first direction, the frame being configured to restrict movement in the first direction of the second bearing that receives the force of the rotation shaft that moves in the first direction.

2. The sheet conveyor according to claim 1, further comprising:

a third bearing configured to support a second end portion of the rotation shaft on an other side in the first direction, the third bearing being formed of material having higher toughness than the first bearing, wherein the third bearing is configured to receive an opposite force from the rotation shaft, the opposite force being in an opposite direction to the force which the second bearing receives from the rotation shaft; and wherein the frame is configured to restrict movement in the first direction of the third bearing that receives the opposite force.

3. The sheet conveyor according to claim 1, wherein the second bearing includes a restricted portion that is restricted from moving in the first direction by the frame; and wherein the first bearing and the restricted portion of the second bearing are located at a same position in the first direction.

4. The sheet conveyor according to claim 1, wherein the rotation shaft includes a protrusion protruding radially farther outward than the rotation shaft;

wherein the first bearing is located between the second bearing and the protrusion in the first direction;

wherein the protrusion is configured to contact the first bearing by movement of the rotation shaft in the first direction; and wherein the second bearing is configured to receive the force of the rotation shaft that moves in the first direction by contacting the first bearing contacted by the protrusion in the first direction.

5. The sheet conveyor according to claim 1, wherein the first bearing includes:

a first bearing body fitted to the first end portion of the rotation shaft; and an engagement portion formed integrally with the first bearing body, the engagement portion engaging with one end of the spring;

wherein the second bearing includes:

a second bearing body fitted to the first end portion of the rotation shaft; and a restricted portion formed integrally with the second bearing body, the restricted portion being restricted from moving in the first direction by the frame;

wherein one of the first bearing body and the second bearing body includes a fitting protrusion protruding to fit to an other one of the first bearing body and the second bearing body in the first direction; and wherein the other one of the first bearing body and the second bearing body includes a fitting recess fitted to the fitting protrusion to restrict relative rotation between the first bearing body and the second bearing body about the rotation shaft.

6. The sheet conveyor according to claim 1, wherein the spring is a compression coil spring formed of a metal wire material; and wherein the sheet conveyor further comprises:

a frame metal plate formed of a metal plate material and connected to ground; and a ground connecting member formed of a metal wire material, the ground connecting member contacting the frame metal plate and the compression coil spring.

7. The sheet conveyor according to claim 6, further comprising:

a chute metal plate formed of a metal plate material, the chute metal plate being configured to guide the sheet toward the first roller and the second roller, wherein the ground connecting member includes a first portion contacting the chute metal plate and a second portion penetrating the frame.

8. The sheet conveyor according to claim 1, wherein the second bearing is formed of a non-conductive resin.

9. The sheet conveyor according to claim 1, wherein the first bearing is configured to directly receive the force of the rotation shaft that moves in the first direction; and wherein the second bearing is configured to receive, via the first bearing, the force of the rotation shaft that moves in the first direction by contacting the first bearing.

10. The sheet conveyor according to claim 1, wherein the second bearing is configured to directly receive the force of the rotation shaft that moves in the first direction.

11. An image forming apparatus comprising:

an apparatus main body;

a sheet conveyor configured to convey a sheet;

a print engine configured to form an image on the sheet; and a drawer movable between a mounted position at which the drawer is mounted on the apparatus main body and a pulled-out position at which the drawer is pulled out from the mounted position, the drawer supporting the print engine, the sheet conveyor comprising:

a first roller including a rotation shaft extending in a first direction;

a second roller facing the first roller in a second direction perpendicular to the first direction, the first roller and the second roller being configured to convey the sheet in cooperation with each other;

a first bearing configured to support a first end portion of the rotation shaft on one side in the first direction, the first bearing being formed of a conductive resin;

a second bearing configured to support the first end portion, the second bearing being formed of a material having higher toughness than the first bearing;

a spring configured to urge the first bearing in a direction in which the first roller presses the second roller, the spring being formed of a conductive material; and a frame configured to support the second bearing to be movable in the second direction, the second bearing being configured to receive a force of the rotation shaft that moves in the first direction, the frame being configured to restrict movement in the first direction of the second bearing that receives the force of the rotation shaft that moves in the first direction, the second roller being rotatably supported by the drawer, the second roller being configured to be separated from the first roller due to movement of the drawer toward the pulled-out position, the drawer including:

a holding surface configured to hold the second bearing to be movable in the second direction in a state where the drawer is at the mounted position; and a releasing surface configured to, when the drawer starts moving from the mounted position toward the pulled-out position, push the second bearing and release pressing of the first roller against the second roller.

12. The image forming apparatus according to claim 11, wherein the sheet conveyor further comprises:

a third bearing configured to support a second end portion of the rotation shaft on an other side in the first direction, the third bearing being formed of material having higher toughness than the first bearing, wherein the third bearing is configured to receive an opposite force from the rotation shaft, the opposite force being in an opposite direction to the force which the second bearing receives from the rotation shaft; and wherein the frame is configured to restrict movement in the first direction of the third bearing that receives the opposite force.

13. The image forming apparatus according to claim 11, wherein the holding surface is a recessed surface recessed upward in the second direction; and wherein the releasing surface is a surface facing downward and in a direction in which the drawer is pulled out.

* * * * *